United States Patent
Hecht et al.

(10) Patent No.: US 11,888,723 B1
(45) Date of Patent: Jan. 30, 2024

(54) COMMUNICATION NETWORK CONFIGURATION

(71) Applicant: ECI Telecom Ltd., Petah Tikva (IL)

(72) Inventors: Inbal Hecht, Petah Tikva (IL); Shirel Ezra, Ganei Tal (IL); Efraim Gelman, Ramat Gan (IL); Hayim Porat, Rishon LeTsyion (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 18/324,848

(22) Filed: May 26, 2023

Related U.S. Application Data

(60) Provisional application No. 63/479,797, filed on Jan. 13, 2023.

(51) Int. Cl.
| | |
|---|---|
| *H04L 29/08* | (2006.01) |
| *H04L 45/02* | (2022.01) |
| *H04L 41/12* | (2022.01) |
| *H04L 45/125* | (2022.01) |

(52) U.S. Cl.
CPC .............. *H04L 45/02* (2013.01); *H04L 41/12* (2013.01); *H04L 45/125* (2013.01)

(58) Field of Classification Search
CPC ........ H04L 45/02; H04L 41/12; H04L 45/125
See application file for complete search history.

(56) References Cited

U.S. PATENT DOCUMENTS

| | | | |
|---|---|---|---|
| 10,721,315 B1* | 7/2020 | Ezra | H04L 67/02 |
| 2018/0262422 A1* | 9/2018 | Gerstel | H04L 45/28 |
| 2020/0195730 A1* | 6/2020 | Ezra | H04L 43/045 |

* cited by examiner

*Primary Examiner* — Walli Z Butt
(74) *Attorney, Agent, or Firm* — Finnegan, Henderson, Farabow, Garrett & Dunner, LLP

(57) ABSTRACT

A network management system can be configured to identify routes for satisfying a set of demands on a communications network using a network graph that represents the communication network. The network graph edges can have edge scores that indicate a priority of the edge. The edge score for a network edge corresponding to a communication link in the communication network can depend on the topology of the communication network or the characteristics of the communication link. The network management system can iteratively identify candidate path(s) on the network graph that correspond to each of the demands and determine a score for each candidate path using the edge scores. In each iteration, the network management system can select the lowest score candidate path, update the network graph to reflect the selection of this candidate path, update the edge scores based on the updating of the network graph, and update the candidate paths for the remaining demands as needed.

21 Claims, 8 Drawing Sheets

US 11,888,723 B1

COMMUNICATION NETWORK CONFIGURATION

CROSS-REFERENCE TO RELATED APPLICATION

The present application claims priority to U.S. Provisional App. No. 63/479,797, filed on Jan. 13, 2023, which is hereby incorporated by reference in its entirety.

TECHNICAL FIELD

The present disclosure relates to the field of communication networks and, more particularly, to systems and methods for routing in communication networks.

BACKGROUND

An optical communication network can be configured to satisfy demands. Such demands can include requests to communicate (or establish a communication channel, or the like) between a source node and a target node in the network. The communication network can satisfy the demands using one or more routes provided through the communication network. Each route can be implemented using hardware (e.g., transceivers, or the like) or software resources (e.g., compute, memory, or the like) of the communication network. Determining routes on a communications network that satisfy a set of demands is an NP-hard problem. Because this problem is NP-hard, determining an optimal assignment of paths, for some optimality criterion, becomes intractable as the size of the optical communication network or number of demands increases.

SUMMARY

Systems and methods are disclosed for configuring a communication network to satisfy a set of demands. A network management system can identify routes for the demands using edge scores determined based on the communication network topology and characteristics of the communication links in the communication network.

The disclosed embodiments include a method for configuring a communication network. The method can include observations. The observations can include obtaining a network graph representing the communication network. The network graph can include vertices corresponding to nodes in the communication network, and edges corresponding to communication links in the communication network. The operations can include determining a score for a first edge in the network graph. The score determination can include determining a first graph cut on the network graph, the first graph cut having a first graph cut rank and a first graph cut edge set that includes the first edge. The score can depend in part on a first value of a first function for the first graph cut rank, the first function being a decreasing function of the first graph cut rank. The operations can include determining, using the score for the first edge, a path on the network graph for a demand on the communication network. The operations can include configuring the communication network to satisfy the demand using the path.

The disclosed embodiments include another method for configuring a communication network. The method can include operations. The operations can include obtaining a network graph representing the communication network. The network graph can include vertices corresponding to nodes in the communication network and edges corresponding to communication links in the communication network, the communications links having equal scores, lengths, and delays and belonging to the same network segment. The network graph can include a first subnetwork graph containing more than 10 vertices and a second subnetwork graph containing more than 10 vertices, the first and second subnetwork graphs connected by only two edges, a first edge between a vertex A in the first subnetwork and a vertex X in the second subnetwork and a second edge between the vertex X and a vertex B in the second subnetwork. The minimum length of a path entirely within the first subnetwork that connects vertex A and vertex B can be greater than three. The operations can include obtaining a demand having vertex A as a source vertex and vertex B as a terminal vertex. The operations can include determining a path connecting vertex A and vertex B, the path excluding the first edge and the second edge. The operations can include configuring the communication network to satisfy the demand using the path.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
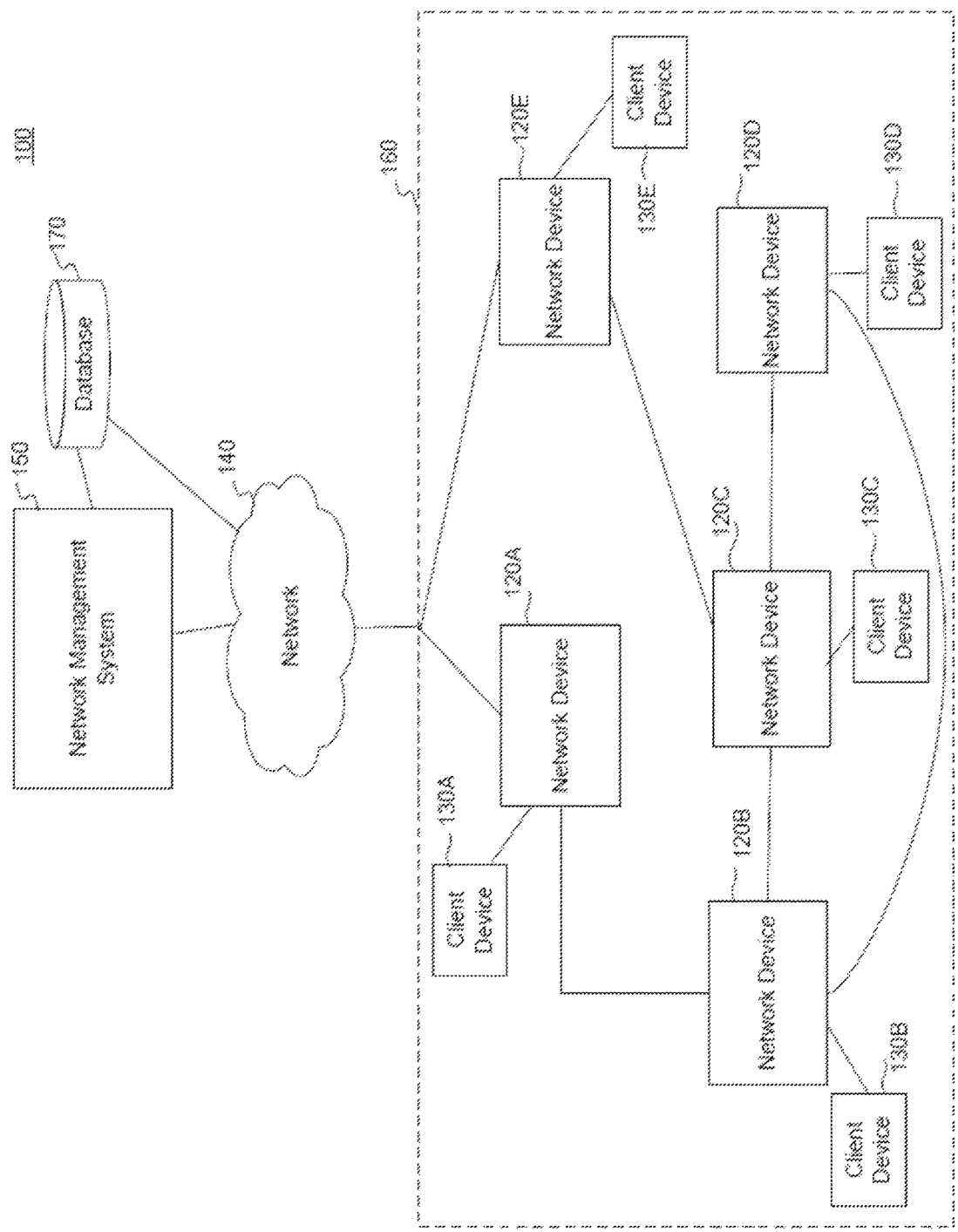
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like).

The disclosed embodiments can be performed using a network graph representing the communication network. The network graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Determining routes on a communications network that satisfy a set of demands is an NP-hard, technical problem. Because this problem is NP-hard, determining an optimal assignment of paths, for some optimality criterion, becomes intractable as the size of the optical communication network or number of demands increases. Furthermore, multiple potential routes can exist between a source node and target node of a demand on the communication network. These routes may have different characteristics. Some routes may use communication links that are higher priority than other communication links.

In some embodiments, a priority of a communication link can depend on the topology of the communications network. As described herein, the communication link can correspond to a network edge in a network graph that represents the communications network. The priority of the communication link can depend upon topological characteristics of the edge such as the availability of alternative edges in the network graph and the centrality of the edge in the network. These topological characteristics can be evaluated using graph cuts.

A graph cut is a set of network edges that, when removed from the network graph, divides the network graph into two disconnected subgraphs. The rank of the graph cuts is the number of network edges in the set. As may be appreciated, the rank of a graph cut including a network edge can indicate the availability of alternative edges in the network graph. The rank of the graph cut is the number of alternative network edges available to service demands originating in one subgraph and terminating in the other. For example, when a graph cut includes only two network edges, these network edges provide the routes connecting the two subgraphs. In such instances, use of the communications links corresponding to these network edges can be deprioritized, hopefully preserving use of these communications links for servicing demands that require them. Similarly, when many low-rank graph cuts include a network edge, that network edge provides one of a limited number of alternative network edges for many other network edges. In such instances, use of the communications link corresponding to this network edge can be deprioritized, hopefully preserving the use of this communication link in case one of the communication links corresponding to one of the other network edges fails.

The centrality of an edge in the network can affect the likelihood that demands necessarily include the edge (or alternatives to the edge). When the source and terminal vertices of a demand on the network graph are in different ones of the two subgraphs formed by the graph cut, any path connecting the source and terminal vertices must include an edge in the cut set. Accordingly, the more vertex pairs on the network graph that include vertices in different ones of the subgraphs, the more paths necessarily include an edge in the cut set. The number of vertex pairs on the network graph that include vertices in different ones of the subgraphs can be maximized when the subgraphs are of equal size and minimized when one of the subgraphs contains a single vertex.

In some embodiments, a priority of a communication link can depend on characteristics of the communications link. Such characteristics can include bandwidth or available bandwidth, length, delay or latency, cost, network segment, or the like. For example, the bandwidth or available bandwidth of a communication link can affect the priority of the communication link. Demands unnecessarily routed through a communications link may prevent satisfaction of demands that require use of that communications link. Accordingly, lower-bandwidth (also referred to herein as lower-capacity) communications links, or communications links have less free-bandwidth (or less free capacity) can be deprioritized as compared to communications links that have more bandwidth or more available bandwidth. Similarly, communications links that are physically longer, exhibit greater delay or latency, cost more to operate, or are part of another network segment may be deprioritized over short, lower delay or latency, cheaper communications links, or network links in the same network segment.

In some embodiments, communication link prioritization can support network segmentation. Certain network edges can be associated with certain logical partitions of the communications network. When a demand is associated with one logical partition, the use of communications links associated with another partition can be deprioritized.

The disclosed embodiments can preferentially satisfy demands on a communication network using lower priority communication links. A network graph can represent the communication network. The network graph can include edges corresponding to communication links in the communication network. A score function can assign higher scores to edges corresponding to lower priority communication links. Paths on the network graph can then be assigned to demands by iteratively selecting paths in a set of candidate paths (e.g., selecting the path in each iteration with the lowest score). If necessary, the unselected candidate paths can be updated (or new candidate paths determined) based on the selection of the lowest score candidate path. The selection process can continue until each demand is assigned a route or no suitable routes exist for the remaining demands.

The disclosed embodiments include score functions configured to assign scores based on at least one of communication network topology, communication link characteristics, or network segmentation. As may be appreciated, such scoring can preserve topologically important or low-bandwidth communications links as backup communications links or for use in servicing demands that require those particular links. In this manner, the disclosed embodiments can improve the capacity and resilience of the communication network. Furthermore, the disclosed embodiments can be used to implement network segmentation schemes and improve service by prioritizing communication links with favorable physical length, delay or latency, or operational score characteristics. Accordingly, the disclosed embodiments constitute a technological improvement in network communications management.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands in the communication system 100 (e.g., by determining routing and wavelength assignment for a given set of demands).

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120 or of the communication links connecting them, the demands and corresponding configurations (e.g., routes or the like) provided by the communication network 160, and so on. Database 170 may also be adapted to store processed information associated with the network topology and demands in the communication network 160, so as to facilitate efficient route configurations and resource allocations to satisfy the demands in the communication network 160. For example, database 170 may be adapted to store a preplan assignment (or components thereof). The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. In some embodiments, the WDM physical layer can be or support an elastic optical network (e.g., a "Flexgrid" network or the like).

Figure 2:
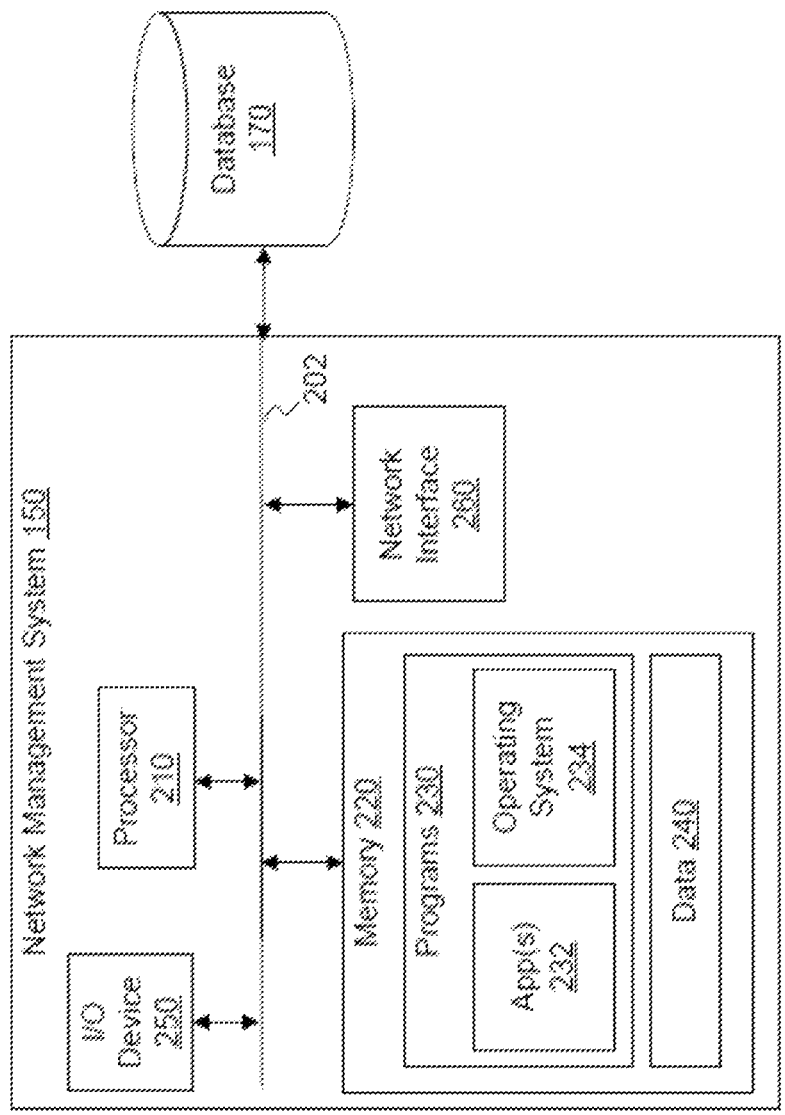
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine paths for demands over a network graph. In some embodiments, network management system 150 can configure a communication network corresponding to the network graph to satisfy the demands using routes corresponding to the paths.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for configuring the communication network to satisfy one or more demands using routes corresponding to determined paths on a network graph corresponding to the communication network.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160.

In some embodiments, program(s) 230 may include operating system 234 performing operating system functions when executed by one or more processors such as processor 210. By way of example, operating system 234 may include Microsoft Windows™, Unix™, Linux™ Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

As described herein, a priority of a communication link can depend upon a topological importance of a corresponding edge in the network graph. The topological importance of the edge in the network graph can depend upon a likelihood that satisfaction of a demand on the network graph would require a path including the edge. In turn, this likelihood can depend upon topological characteristics of the edge such as the centrality of the edge in the network and the availability of alternative edges in the network graph.

Figure 3A:
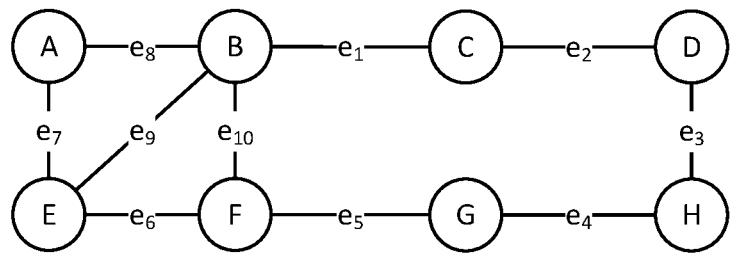
FIGS. 3A to 3H depict exemplary graph cuts including a network edge, consistent with disclosed embodiments.

As depicted in FIGS. 3A to 3H, the topological characteristics of an edge can be evaluated using graph cuts, consistent with disclosed embodiments. FIG. 3A depicts a network graph 300 including vertices A to E and edges $e_1$ to $e_{10}$, consistent with disclosed embodiments. Network graph 300 can represent a communication network, with the vertices corresponding to nodes of the communication network and the edges corresponding to communication links of the communication network. FIGS. 3B to 3H depict exemplary graph cuts of the network graph 300 depicted in FIG. 3A. Each of the exemplary graph cuts has a cut set that includes edge $e_1$ and partitions the graph into two disjoint subsets. A rank of each graph cut can be the number of edges included in the edge set of the graph cut.

Figure 3B:
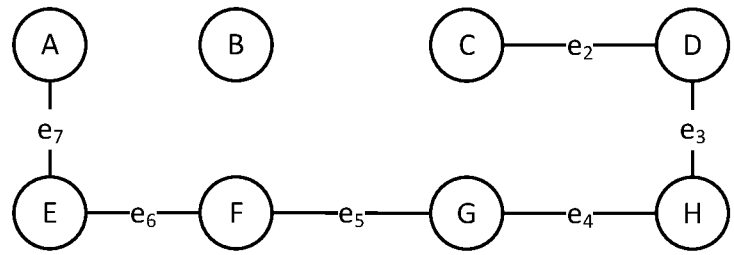

FIG. 3B depicts the graph cut $c_1$ formed by removing edges $e_1$ and $e_8$ from the graph, forming the graph subsets {B} and {A, C, D, E, F, G, H}. As the edge set includes two edges, the graph cut rank is 2. The set of unique endpoint pairs $s_1$ is {BA, BC, BD, BE, BF, BG, BH}, a set of size 7.

Figure 3C:
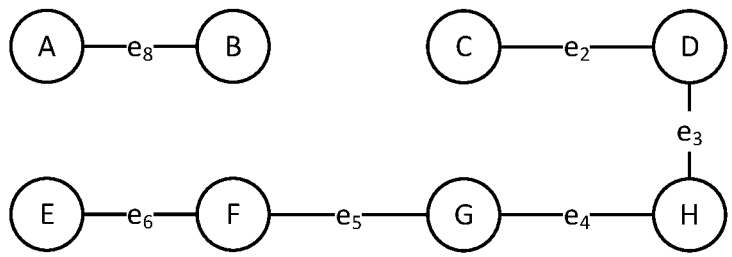

FIG. 3C depicts the graph cut $c_2$ formed by removing edges $e_1$, $e_7$, $e_9$, and $e_{10}$ from the graph, forming the graph subsets {A, B} and {C, D, E, F, G, H}. As the edge set includes four edges, the graph cut rank is 4. The set of unique endpoint pairs $s_2$ is {AC, AD, AE, AF, AG, AH, BC, BD, BE, BF, BG, BH}, a set of size 12.

Figure 3D:
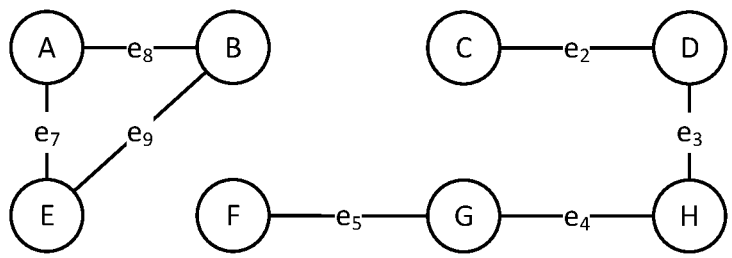

FIG. 3D depicts the graph cut $c_3$ formed by removing edges $e_1$, $e_6$, and $e_{10}$ from the graph, forming the graph subsets {A, B, E} and {C, D, F, G, H}. As the edge set includes 3 edges, the graph cut rank is 3. The set of unique endpoint pairs $s_3$ is {AC, AD, AF, AG, AH, BC, BD, BF, BG, BH, EC, ED, EF, EG, EH}, a set of size 15.

Figure 3E:
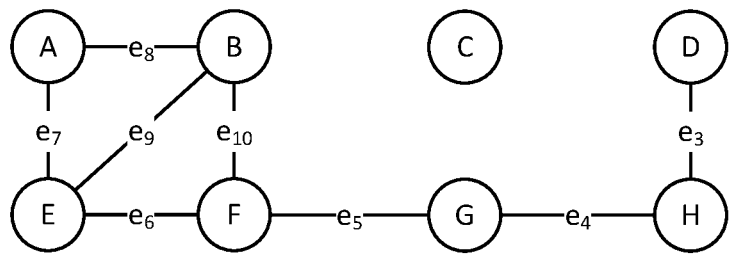

FIG. 3E depicts the graph cut $c_4$ formed by removing edges $e_1$ and $e_2$ from the graph, forming the graph subsets {C} and {A, B, D, E, F, G, H}. As the edge set includes 2 edges, the graph cut rank is 2. The set of unique endpoint pairs $s_4$ is {CA, CB, CD, CE, CF, CG, CH}, a set of size 7.

Figure 3F:
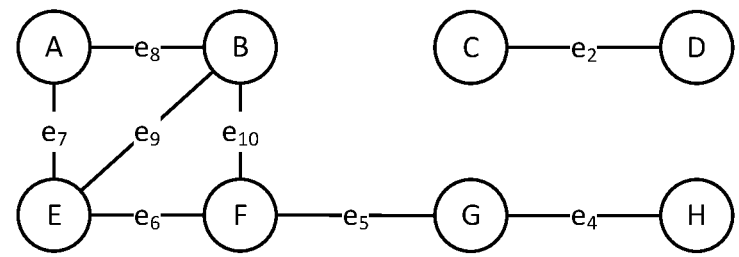

FIG. 3F depicts the graph cut $c_5$ formed by removing edges $e_1$ and $e_3$ from the graph, forming the graph subsets {C, D} and {A, B, E, F,G,H}. As the edge set includes two edges, the graph cut rank is 2. The set of unique endpoint pairs $s_5$ is {CA, CB, CE, CF, CG, CH, DA, DB, DE, DF, DG, DH}, a set of size 12.

Figure 3G:
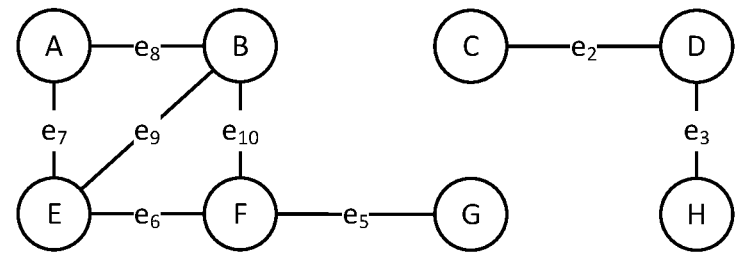

FIG. 3G depicts the graph cut $c_6$ formed by removing edges $e_1$ and $e_4$ from the graph, forming the graph subsets {C, D, H} and {A, B, E, F, G}. As the edge set includes two edges, the graph cut rank is 2. The set of unique endpoint pairs $s_6$ is {CA, CB, CE, CF, CG, DA, DB, DE, DF, DG, HA, HB, HE, HF, HG}, a set of size 15.

Figure 3H:
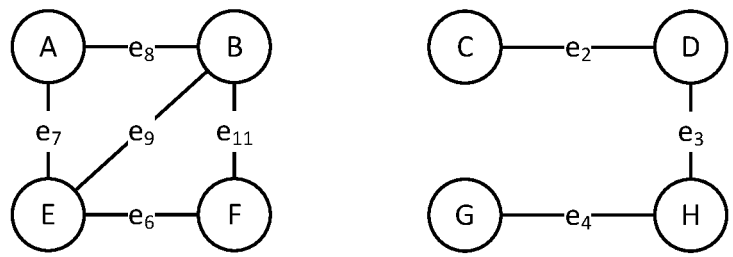

FIG. 3H depicts the graph cut $c_7$ formed by removing edges $e_1$ and $e_4$ from the graph, forming the graph subsets {C, D, H, G} and {A, B, E, F}. As the edge set includes two edges, the graph cut rank is 2. The set of unique endpoint pairs $s_7$ is {CA, CB, CE, CF, DA, DB, DE, DF, HA, HB, HE, HF, GA, GB, GE, GF}, a set of size 16.

In some embodiments, a score can be determined for edge $e_1$ based at least in part on the centrality of edge $e_1$ and the availability of alternative edges in the network graph. The centrality of edge $e_1$ can indicate a likelihood that the source and terminal vertices of a demand on the network graph (e.g., corresponding to source and terminal nodes of the demand on the communication network) are in different subgraphs. The availability of alternative edges in the network graph can indicate the number of edges that can fail (including edge $e_1$) before the network graph is partitioned into two subgraphs.

In some embodiments, the score for edge $e_1$ can include components corresponding to different graph cut ranks. A score function can determine a score for each component. The score can depend on the graph cuts having the corresponding graph cut rank.

In the example depicted in FIGS. 3A to 3H, a first component can correspond to rank 2. A score function can determine a score for the first component. The score can depend on the graph cuts having rank 2 (e.g., $c_1$, $c_4$, $c_5$, $c_6$, and $c_7$).

In some embodiments, the score function can be an increasing function of the centrality of edge $e_1$ (e.g., the value of the score function can increase with increasing centrality of edge $e_1$). In some embodiments, the centrality of edge $e_1$ for a graph cut rank can depend upon the sets of cut endpoint pairs (e.g., source and terminal vertex pairs, where the source and the target are disconnected by the graph cut) for the graph cuts having the graph cut rank. In some embodiments, the centrality of edge $e_1$ for a graph cut rank can depend on the set of unique cut endpoint pairs for the graph cuts having the graph cut rank 2.

In this example, the centrality of edge $e_1$ can depend upon the sets of endpoint pairs for the graph cuts having the graph cut rank 2 (e.g., $s_1$, $s_4$, $s_5$, $s_6$, and $s_7$). The set of unique cut endpoint pairs for graph cut rank 2 can be:

$$S_{rank2}=s_1 \cup s_4 \cup s_5 \cup s_6 \cup s_7=\{BA,BC,BD,BE,BF,BG,BH,\\ CA,CD,CE,CF,CG,CH,DA,DE,DF,DG,DH,HA,\\ HE,HF,HG,GA,GE,GF\}.$$

In some embodiments, the score function can depend on the size of the set of unique cut endpoint pairs. In some embodiments, the score function can be normalized by the total possible number of endpoint pairs. For example:

$$f_1(2)=|S_{rank2}|/C_2^{|V|}$$

where function $f_1(2)$ is the score function evaluated for cut rank 2, $|S_{rank2}|$ is the size of the set of unique endpoint pairs for the graph cuts of rank 2, $|V|$ is the number of vertices in the network graph, and $C_2^{|V|}$ is the number of possible pairs of vertices in the network graph. In some embodiments, the number of possible pairs of vertices in the network graph can be approximated to a constant factor of ½ as $|V|^2$. Accordingly, the score function can be a decreasing function of the number of vertices in the network graph (the value of the function decreases as the number of vertices in the network graph increases). In this example, $|S_{rank2}|$ can be 25, $C_2^{|V|}$ can be 28, and the value of $f_1$ can be 25/28.

In some embodiments, the score function can be an increasing function of the subsets generated by the graph cuts. For example, when each graph cut partitions the network graph into subsets S and T, the score function can be an increasing function of |S|, the size of subset S, and |T|, the size of subset T.

In some embodiments, the score function can be a decreasing function of the number of the cut rank (the value of the function decreases as the cut rank increases). For example:

$$f_1(k)=1/k$$

where k is the cut rank for the first component. In this example, the cut rank can be 2 and $f_1$ can be 0.5.

In some embodiments, the score for the first component can be an increasing function of the size of the set of endpoint pairs, a decreasing function of the number of vertices in the network graph, and a decreasing function of the cut rank. For example:

$$f_1(k)=|S_{rank\ k}|/(k \cdot C_2^{|V|})$$

In this example, $|S_{rank\ 2}|$ can be 25, $C_2^{|V|}$ can be 28, the cut rank can be 2, and the value of $f_1$ can be 25/56.

In the example depicted in FIGS. 3A to 3H, a second component can correspond to rank 3. A score function can determine a score for the second component. The score can depend on the graph cuts having rank 3 (e.g., $c_3$). In this example, $$S_{rank\ 3}=S_3=\{AC,AD,AF,AG,AH,BC,BD,BF,BG,BH,\\ EC,ED,EF,EG,EH\}.$$

As described herein, the score can be an increasing function of the size of the set of cut endpoint pairs, a decreasing function of the number of vertices in the network graph, and a decreasing function of the cut rank. For example:

$$f_1(3) = |S_{rank\ 3}|/(3 \cdot C_2^{|V|}) = 15/(3 \cdot 28)$$

Where $f_1(3)$ is the score function evaluated for cut rank 3 involving $e_1$.

In the example depicted in FIGS. 3A to 3H, a third component can correspond to rank 4. A score function can determine a score for the third component. The score can depend on the graph cuts having rank 4 (e.g., $c_2$). In this example, $$S_{rank\ 4} = S_2 = \{AC, AD, AE, AF, AG, AH, BC, BD, BE, BF, BG, BH\}.$$

As described herein, the score can be an increasing function of the size of the set of cut endpoint pairs, a decreasing function of the number of vertices in the network graph, and a decreasing function of the cut rank. For example:

$$f_1(4) = |S_{rank\ 4}|/(4 C_2^{|V|}) = 12/(4 \cdot 28)$$

Where $f_1(4)$ is the score function evaluated for cut rank 4.

Consistent with disclosed embodiments, a total score for edge $e_1$ can be determined by combining the scores for the first, second, and third components. In some embodiments, these scores can be summed. For example, the total score can be:

$$S_{total} = \sum_{r=1}^{r_{max}} f_1(r)$$

Where the contributions of the function $f_1$ for each cut rank are summed. As may be appreciated, the contribution to the score of the higher cut ranks may quickly decrease. Accordingly, in some embodiments, the contributions can be summed from cut rank 1 to some maximum cut rank $r_{max}$. In various embodiments, $r_{max}$ can be 2, 3, 4, or more.

In the example depicted in the FIGS. 3A to 3H:

$$S_{total} = \tag{2}$$
$$f_1(2) + f_1(3) + f_1(4) = \frac{25}{56} + \frac{15}{84} + \frac{12}{112} = \frac{300}{672} + \frac{120}{672} + \frac{72}{672} = \frac{492}{672}$$

The score of edge $e_1$, based on the topological characteristics of the edge and using the above-mentioned score function, can be 492/672. As described herein, the score can depend on additional factors, such as the characteristics of the communications link corresponding to edge $e_1$, or network segmentation requirements. Such additional factors may increase or decrease the score for $e_1$. Furthermore, as may be appreciated, the disclosed embodiments are not limited to the above-referenced score functions. Other suitable score functions can be used.

Figure 4A:
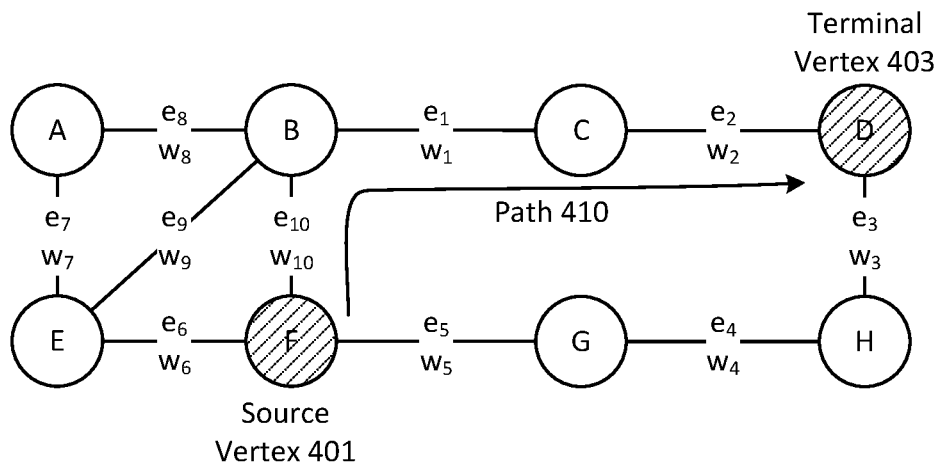
FIG. 4A depicts determination of a path between a source vertex and a terminal vertex on a network graph, consistent with disclosed embodiments.

FIG. 4A depicts determination of a path between a source vertex (e.g., source vertex 401) and a terminal vertex (e.g., terminal vertex 403) on a network graph (e.g., network graph 300), consistent with disclosed embodiments. The network graph can represent a communications network and include vertices (e.g., vertices A to H) corresponding to nodes of the communication network and edges (e.g., edges $e_1$ to $e_{10}$) corresponding to communication links of the communication network. The edges of the network graph can be associated with weights (e.g., weights $w_1$ to $w_{10}$). A path-finding method can use these weights to identify a lowest-score path from a source vertex to a destination vertex (e.g., path 410).

In this example, the weights can be calculated as $$S_{total} = \sum_{k=1}^{3} |S_{rank\ k}|/(k^2 \cdot |V|^2).$$

In this weight function, the contribution to the score decreases more rapidly with increasing cut rank $$\left(\text{e.g., } \frac{1}{k^2}\right)$$

than the example provided above (e.g., 1/k). As may be appreciated, other scoring functions may be used. Accordingly, the weights can be:

$e_1 = e_2 = e_3 = e_4 = e_5 = 0.09114583333333333$ $e_6 = 04861111111111111$ $e_8 = 0.037760416666666664$ $e_9 = 0.022569444444444444$ $e_{10} = 0.04340277777777778$

Given these weights, the least-cost path 410 can proceed from source vertex 401 to terminal vertex 403 through edge $e_{10}$.

As described herein, a priority of a communication link can depend upon characteristics of the communication link. Such communication link characteristics can include bandwidth (or available bandwidth), cost, length, delay or latency, network segment, or the like. The available bandwidth can be the difference between the capacity of a communication link and the requirements of the route(s) already using that communication link. For example, a communication link can have a bandwidth of 10 Gbps. Two routes for two separate demands can use the communication link. The first demand can have a size of 1 Gbps and the second demand can have a size of 5 Gbps. The available bandwidth can then be 4 Gbps. In some embodiments, score(s) may be associated with one or more of these communication link characteristics. For example, a bandwidth score can be determined based on the bandwidth of the link and a delay score can be determined based on a delay or latency of the link. As an additional example, a communication link characteristics score can be determined based on the bandwidth, delay or latency, and cost of the communication link.

In some embodiments, an overall score for the edge can depend on a combination (e.g., a function, mapping, or the like) of the topographical score for the edge (e.g., based on the centrality of the edge and the availability of alternative edges) and the score(s) for the characteristics of the communication link. As may be appreciated, the contribution of a communication link characteristic to the overall score can depend on the communication link characteristics. In some embodiments, a higher score can deprioritize inclusion of an edge in paths connecting a source and a terminal vertex. The marginal contribution of a communication link characteristics that supports de-prioritization can be positive (e.g., the more the communication link characteristic supports de-prioritization, the higher the overall score). For example, the lower the bandwidth (or the greater the delay or latency), the greater the overall score (all other things being equal). Conversely, the marginal contribution of a communication link characteristics that supports prioritization can be negative (e.g., the more the communication link characteristic supports prioritization the lower the overall score). For example, the shorter the physical length of the communication link (or the lower the signal-to-noise ratio of the communication link), the lower the overall score (all other things being equal).

Figure 4B:
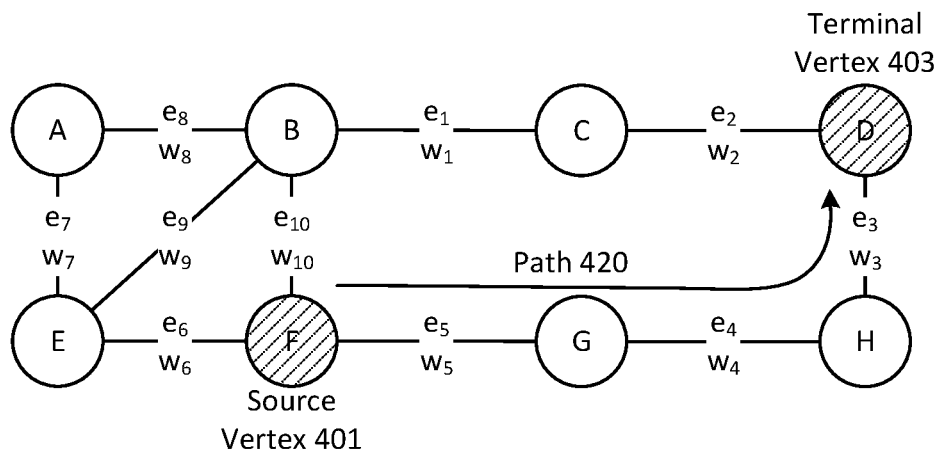
FIG. 4B depicts the effect of considering communications link characteristics on the route determination depicted in FIG. 4A, consistent with disclosed embodiments.

FIG. 4B depicts the effect of considering communications link characteristics on the route determination depicted in FIG. 4A, consistent with disclosed embodiments. In the example depicted in FIG. 4B, edges $e_1$, $e_2$, and $e_4$ to $e_{10}$ all have an available bandwidth of 1 Gbps. Edge $e_3$ has an available bandwidth of 10 Gbps. In this example, an overall score for an edge can be a product of a first function (e.g., a function concerned with the topological importance of a communication link, as described with regards to FIGS. 3A to 3H and 4A) and a second function concerned with the available bandwidth of the communication link. For example, the second function can be:

$f_2 = 1/\text{available\_bandwidth}$ and the overall score can be:

$$S_{total} = f_2 \cdot \sum_{k=1}^{3} |S_{rank\ k}|/(k^2 \cdot |V|^2)$$

In this example, the score of edge $e_3$ can be:

$S_{total} = 0.1 \cdot 0.09114583333333333 = 0.009114583333333333$

Under this scoring measure, the total score for edge $e_3$ is lower than the total score for edge $e_{10}$. A path-finding method can use these weights to identify a lowest-score path from source vertex 401 to terminal vertex 403. Given these weights, path 420 can proceed from source vertex 401 to terminal vertex 403 through edge $e_3$.

Consistent with disclosed embodiments, changes in the topology of a communication network can affect the scores associated with the remaining communication links. Such changes can include the failure of nodes or communication links in the communication network or the addition of new nodes or communication links in the communication network. Furthermore, the overall score associated with a communication link may be affected by changes in the characteristics of that communication link (e.g., bandwidth or available bandwidth, or the like). For example, as demands are added to a communication network, the available capacity of communication links in the network can change, affecting the scores associated with those communication links. Additionally, changes to network segmentation can affect the scores associated with communication links belonging to different network segments.

Consistent with disclosed embodiments, weights for edges on a network graph representing the communication network can be recalculated in response to changes in the communication network topology or to changes in communication network characteristics. In some embodiments, weights can be updated whenever a change in communication network topology or communication network characteristics occurs. However, such an approach may be resource intensive.

In some embodiments, weights can be updated when an update condition is satisfied. In some embodiments, the update condition can be satisfied when a threshold number of demands on the communication network is reached. In some embodiments, routes for demands can be added to a communication network until a pre-defined number of demands have been assigned. The weights on the communication network can then be updated based on the current communication link characteristics of the network.

In some embodiments, the update condition can depend on changes in available bandwidth. For example, the update condition can be satisfied when the available bandwidth on any link in the communication network changes at all, or changes by more than a threshold amount. The threshold amount can be a static threshold amount (e.g., a predetermined amount, or the like), or a dynamic amount. A dynamic threshold amount can depend on the number of demands on the communication network that have been assigned. For example, the dynamic threshold amount can be high when few demands have been assigned. The dynamic threshold amount can decrease as the number of demands increases and the communication network becomes more crowded.

As may be appreciated, when communication links fail, the topology of the network graph can change. Because the topology of the network graph changes, the centrality and availability of alternative edges can change for the remaining edges in the network graph. Furthermore, paths on the network graph can become invalid, forcing rerouting of those paths. Rerouting those paths can change the available bandwidth of other links in the communication network. Similarly, when new nodes or communication links are added, the centrality and availability of alternative edges can change for the existing edges in the network graph. Accordingly, in some embodiments, weights can be updated whenever the topology of the communication network changes. Routes can then be redetermined based on the updated weights. However, this approach can be resource intensive. Furthermore, rerouting existing demands may result in service disruptions.

In some embodiments, weights can be updated for the network graph corresponding to the communication network. But rerouting can be limited to demands satisfying a criterion. In some embodiments, the criterion for rerouting a demand can be satisfied when the route for the demand includes failed communication links. In such embodiments, routes can be progressively updated as stale demands cease (or are rerouted due to failures) and are replaced with new demands having new routes. In some embodiments, the criterion for rerouting a demand can be satisfied when updating the weights on the network graph sufficiently changes (e.g., in absolute or proportional terms) a total weight for a path on the network graph corresponding to the demand. For example, a path corresponding to the demand can have a total weight of 10.234 prior to updating the weights on the network graph. After updating the weights on the network graph, the path can have a total weight of 12.234. In this example, the path can be recalculated using the updated weights when the threshold for a sufficient change in the weights is 1.0 units, but not when the threshold for a sufficient change in the weights is a 30% change.

In some embodiments, demands affected by the change in the topology of the communication network can be rerouted using the existing weights. Such an approach can avoid the resource usage required to calculate new weights. However, reusing existing weights may cause the new routes to use communication links rendered critical by the failure of alternative routes.

Figure 4C:
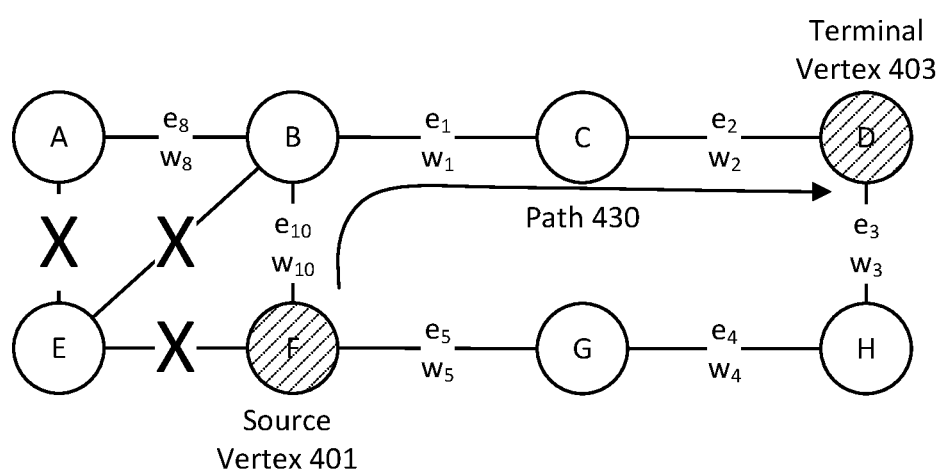
FIG. 4C depicts the effect of changes in network topology on the route determination depicted in FIG. 4B, consistent with disclosed embodiments.

FIG. 4C depicts the effect of changes in network topology and communication link characteristics on the route determination depicted in FIG. 4B, consistent with disclosed embodiments. In this example, links connected to node E have failed. The resulting topological scores, calculated as described above with regards to FIGS. 3A to 3H, are:

$$e_1=e_2=e_3=e_4=e_5=e_{10}=0.078125$$

$$e_8=0.09375$$

As may be seen, the failure of communication links corresponding to edges $e_6$, $e_7$, and $e_9$ has decreased the availability of alternative edges to edge $e_{10}$. Accordingly, the weight of edge $e_{10}$ has increased from 0.04340277777777778 to 0.078125. However, in this example, the available bandwidth of the communication link corresponding to edge $e_3$ has decreased to 0.8 Gbps, while the available bandwidths of the communication links corresponding to the remaining edges have remained 1.0 Gbps. Accordingly, the total score of edge $e_3$ is:

$$S_{total} = \frac{1}{0.8} \cdot 0.078125 = 0.09765625$$

Under this scoring approach, despite the change in topological scores, the total score for edge $e_3$ is greater than the total score for edge $e_{10}$. A path-finding method can use the updated weights to identify a lowest-score path from source vertex 401 to terminal vertex 403. Given the updated weights, path 430 can proceed from source vertex 401 to terminal vertex 403 through edge $e_{10}$.

Figure 5:
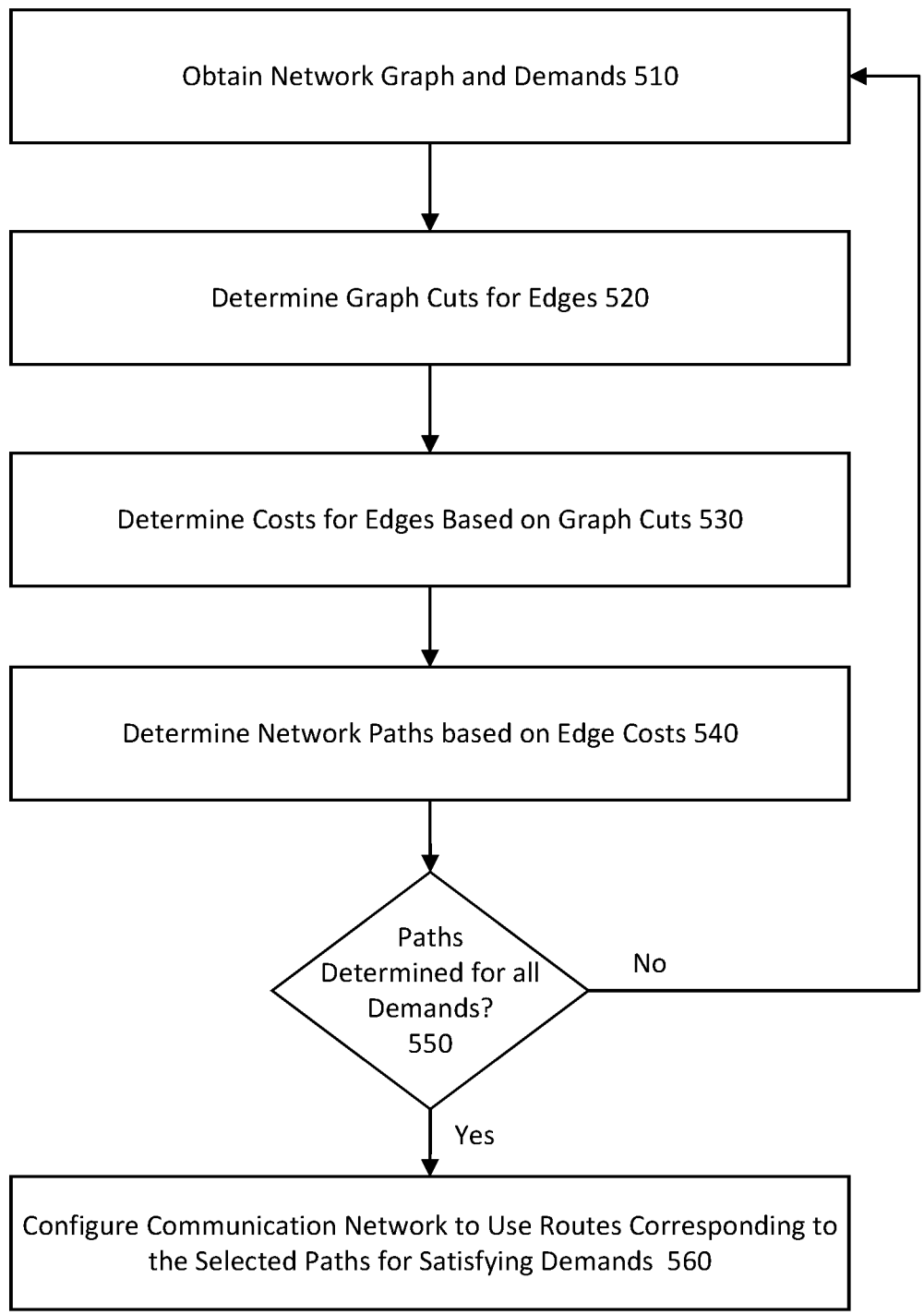
FIG. 5 depicts an exemplary process for configuring a communication network using edge scores, consistent with disclosed embodiments.

FIG. 5 depicts an exemplary process 500 for configuring a communication network (e.g., communication network 160) using edge scores, consistent with disclosed embodiments. For convenience of explanation, process 500 is described as being performed by a network management system of a communication system (e.g., management system 150 of communication system 100). However, the disclosed embodiments are not so limited. Consistent with disclosed embodiments, process 500 can be performed at least in part by another component of the communication system, or another system.

In step 510, the network management system can obtain a network graph, consistent with disclosed embodiments. The network graph can represent the communication network. The network graph can include vertices corresponding to nodes of the communication network and edges corresponding to communication links in the communication network. In some embodiments, the network management system can obtain communication link characteristics for the communication links associated with the edges in the network graph.

In some embodiments, the network management system can receive or retrieve the network graph from another component of a communication system (e.g., communication system 100, or the like). For example, the network graph can be retrieved from a database associated with the communication system (e.g., database 170, or the like). As an additional example, the network graph can be received from one or more nodes of the communication network.

In some embodiments, the network management system can create the network graph using information received or retrieved from other component(s) of the communication system. In some embodiments, the information can indicate or specify the connectivity of nodes in the communication system. For example, a node can provide the network management system a list of the other nodes connected to that node. As an additional example, a database associated with the communication system can provide a list or lists of connections between nodes. In these examples, the network management system can generate a network graph representing the communication network using these list(s).

In step 520, the network management system can determine graph cuts for edges, consistent with disclosed embodiments. The disclosed embodiments are not limited to any particular method of determining graph cuts. As a non-limiting example, the network management system can select a set of edges in the network graph, such that if removed from the network graph, the network graph will be partitioned into two connected components, while any subset of the set of edges will not partition the graph if removed. The set of edges forms a graph-cut of rank k, where k is the size of the edge set.

In step 530, the network management system can determine scores for edges, consistent with disclosed embodiments. As may be appreciated, steps 520 and 530 can be performed in series, as shown in FIG. 5, or overlapping in time. For example, the network management system can determine a score for an edge after the graph cuts are determined for that edge, and before graph cuts are determined for one or more of the remaining edges on the network graph. As an additional example, the network management system can determine graph cuts for all edges and then begin determining scores for individual edges.

In some embodiments, the overall score for an edge can depend upon a topographical score for the edge. The topographical score for the edge can depend upon the centrality of the edge and the availability of alternative edges. As described herein, the centrality of the edge and the availability of alternative edges can be evaluated using the graph cuts determined in step 520 (e.g., as described with regards to FIGS. 3A to 3H). In various embodiments, the overall score for the edge can further depend upon score(s) based upon characteristics of a communication link in the communication network that corresponds to the edge (e.g., as described with regards to FIGS. 4B and 4C).

In step 540, the network management system can determine candidate network paths for the demands, consistent with disclosed embodiments. In some embodiments, the candidate paths can be determined using the edge scores. In some embodiments, the network management system can select the candidate path having the lowest score as the path for use in satisfying the corresponding demand.

In some embodiments, the overall score for an edge can depend on a network segment associated with the edge. For example, the overall score for the edge can depend upon a topological score (e.g., as described above with regards to FIGS. 3A to 3I), score(s) for communication link characteristics (e.g., as described with regards to FIGS. 4B and 4C), and a score offset dependent on network segment.

In such embodiments, the communication network can include multiple network segments (or network segments). Such network segments can be associated with entities (e.g., different customers, or the like), geographical regions (e.g., Europe, the United States, or the like), security protocols or levels of service, logical divisions imposed on the communication network (e.g., for organizational or logistical purposes) or other characteristics that distinguish nodes or sets of nodes in the communication network. In some embodiments, the network segments can be overlapping. For example, a node in the communication network can be part of logical division A, geographic division "Europe", and service-level division "enhanced service." In some instances, a communication link can be associated with a network segment when the endpoint nodes (or one of the endpoint nodes) of the communication link are included in the network segment. In some embodiments, an edge in the network graph can be associated with a network segment when the edge corresponds to a communication link associated with the network segment.

In some embodiments, the score offset can be independent of the demand. For example, certain logical divisions in the network can be deprioritized. A score offset can be added to edges associated with that logical division. The score offset can be selected to prevent routing through those edges (unless necessary to satisfy a demand).

In some such embodiments, the score offset can depend on characteristics of a demand. Such characteristics can indicate entities, geographic regions, security protocols or levels of service, logical divisions imposed on the communication network, or other characteristics that distinguish demands or sets of demands. The network management system can determine the offset when determining a path on the network graph for the demand.

In some embodiments, the network management system can be configured with rules or functions that map from combinations of demand characteristics and network segments to score offsets. For example, a demand having source and terminal nodes in Europe can have the characteristic "Europe." The communication network can include multiple geographic network segments. One of these network segments can be the "Europe" network segment and can include nodes geographically located in Europe. The network management system can be configured with a rule that, when the demand has the characteristic "Europe," causes the network management system to add an offset score to any edge associated with a geographic network segment other than the "Europe" network segment. This offset score can increase the likelihood that communications between parties located in Europe pass through communication nodes in Europe. As an additional example, a demand can be associated with the characteristic "Customer A." The communication network can include multiple service tier segments. One of these network segments can be the "Priority" network segment and can include nodes connected by high-bandwidth, low-noise communication links. The network management system can be configured with a rule that, when the demand has the characteristic "Customer A," causes the network management system to add an offset score to any edge associated with the "Priority" network segment. This offset score can reduce the likelihood that communications by Customer A use high-bandwidth, low-noise communication links (which may be preferentially reserved for other customers).

Consistent with disclosed embodiments, routes can be determined for the demands using the overall scores. The disclosed embodiments are not limited to any particular path-finding method. Instead, a suitable method that determines a route based on the scores of the edges included in the route can be used. In some embodiments, for example, a Dijkstra, Bellman-Ford, or Min-Cost Flow path-finding technique can be used.

In step 550, the network management system can determine whether paths have been selected for all of the demands, consistent with disclosed embodiments. If so, process 500 can process to step 560. If not, process 500 can return to step 510.

Upon returning to 510, the network management system can remove the demand corresponding to the selected candidate path from the set of demands (or otherwise indicate that a path has been determined for that demand). In some embodiments, the network graph can be updated to reflect the selection of the candidate path for the demand. For example, the network management system can update the available bandwidth of communication links. In some embodiments, the network management system can identify communication links that are at capacity and remove corresponding edges from the network graph, or otherwise prevent such communication links from being included in additional routes.

In some embodiments, as described with regards to FIG. 4C, weights can be updated in steps 520 and 530 whenever a change in communication network topology or communication network characteristics occurs (e.g., when the assignment of a demand to a route changes available bandwidth or causes a communication link to reach capacity). But such an approach may be resource intensive. In various embodiments, weights can be updated in steps 520 and 530 when an update condition is satisfied.

In some embodiments, the network graph may not be updated upon selection of a candidate path. In such embodiments, rather than returning to step 510, the network management system may select the lowest-score candidate path for each demand determined in step 540 for use in satisfying the corresponding demand. The network management system may then proceed to step 560.

In step 560, the network management system can configure the communication network to use routes corresponding to the selected paths for satisfying the demands, consistent with disclosed embodiments. In some embodiments, the network management system can directly or indirectly provide instructions to components of communication network 160 (e.g., nodes 120, or the like). For example, the network management system can provide instructions to a database. Nodes can then obtain the instructions from the database. Alternatively or additionally, the network management system can provide instructions directly to nodes. When processed by the components, the instructions can cause the components to (e.g., collectively) implement the assignment of demands to routes on the communication network. The disclosed embodiments are not limited to any particular method of configuring the communication network.

Figure 6:
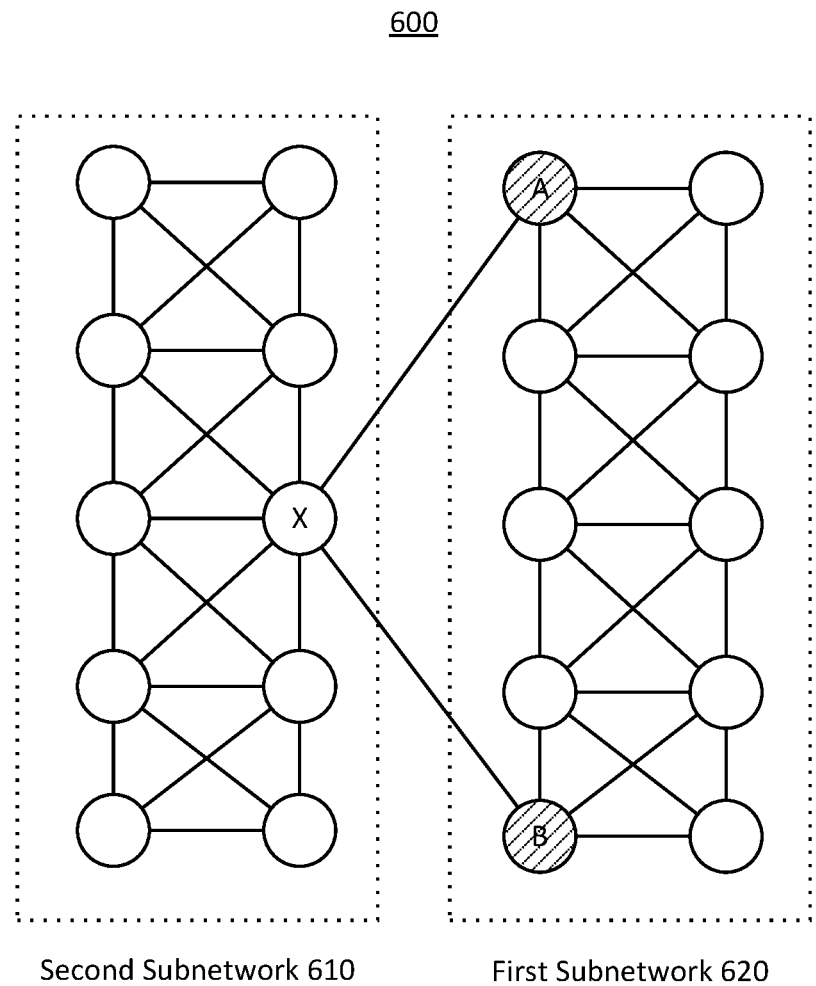
FIG. 6 depicts an exemplary network graph corresponding to a communication network with a particular architecture, consistent with disclosed embodiments.

FIG. 6 depicts an exemplary network graph 600 corresponding to a communication network with a particular architecture, consistent with disclosed embodiments. Network graph 600 includes two subnetworks, first subnetwork 610 and second subnetwork 620, corresponding to subnetworks in the communication network. First subnetwork 610 and second subnetwork 620 both include more than 10 vertices. As depicted in FIG. 6, vertices within each of first subnetwork 610 and second subnetwork 620 are densely connected. But only two edges connect first subnetwork 610 and second subnetwork 620 (e.g., edge XA and edge XB). The characteristics of the communications links in the communication network can be the same. The communication links can have equal costs, lengths, and delays. The communication links can also belong to the same network segment.

In this example, a demand on the communication network has a source node that corresponds to vertex A and a terminal node that corresponds to vertex B. The minimum length of a path entirely within first subnetwork 610 that connects vertex A and vertex B is greater than three (e.g., greater than the minimum length of a path through node X).

Because of the centrality and lack of available alternative edges, the scores associated with edges AX and BX are extremely high. Accordingly, the network management system can determine that the minimum path from A to B excludes edges AX and BX (e.g., the path is contained entirely within first subnetwork 610). As described herein, the network management system can configure the communication network to satisfy the demand using this path.

The disclosed embodiments may further be described using the following clauses:

1. A method for configuring a communication network, comprising: obtaining a network graph representing the communication network, the network graph including: vertices corresponding to nodes in the communication network; and edges corresponding to communication links in the communication network; determining a score for a first edge in the network graph, the score determination comprising: determining a first graph cut on the network graph, the first graph cut having a first graph cut rank and a first graph cut edge set that includes the first edge; and wherein the score depends in part on a first value of a first function for the first graph cut rank, the first function being a decreasing function of the first graph cut rank; determining, using the score for the first edge, a path on the network graph for a demand on the communication network; and configuring the communication network to satisfy the demand using the path.

2. The method of clause 1, wherein: the first graph cut divides the network graph into a first subnetwork including first vertices and a second subnetwork including second vertices; and the score determination further comprises: determining a first endpoint pair set corresponding to the first graph cut, the first endpoint pair set including an endpoint pair comprising one of the first vertices and one of the second vertices; and wherein the score further depends on the first endpoint pair set.

3. The method of any one of clauses 1 to 2, wherein: the score determination further comprises: determining a first rank endpoint pair set corresponding to the first graph cut rank, the first rank endpoint pair set being a union of endpoint pair sets corresponding to graph cuts on the network graph, the graph cuts having the first graph cut rank and graph cut edge sets including the first edge; and wherein the first function is also an increasing function of a size of the first rank endpoint pair set.

4. The method of any one of clauses 1 to 3, wherein: the first function is also a decreasing function of the number of vertices in the network graph.

5. The method of any one of clauses 1 to 4, wherein: the score determination comprises: determining a second graph cut on the network graph, the second graph cut having a second graph cut rank differing from the first graph cut rank and a second graph cut edge set that includes the first edge; and wherein the score depends in part on a second value of the first function for the second graph cut rank.

6. The method of any one of clauses 1 to 5, wherein: the path on the network graph for the demand on the communication network is determined using the score for the first edge and the Dijkstra, Bellman-Ford, or Min-Cost Flow path-finding techniques.

7. The method of any one of clauses 1 to 6, wherein: the score depends in part on a second value of a second function, the second function being: a decreasing function of a bandwidth or available bandwidth of a first communication link on the communication network that corresponds to the first edge; or a function of at least one of cost, length, delay, or network segment.

8. The method of any one of clauses 1 to 6, wherein: the score depends in part on a second value of a second function, the second function being: a decreasing function of the bandwidth or available bandwidth of the first communication link; and the method further comprises: determining that an update condition of the communication network or a bandwidth condition of the first communication link has been satisfied; and in response to the determination, updating the score of the first edge.

9. The method of clause 8, wherein: the update condition is satisfied when: a number of demands on the network have been assigned; and the bandwidth condition is satisfied when: available bandwidth of the first communication link changes; the available bandwidth of the first communication link changes by more than a static threshold amount; or the available bandwidth of the first communication link changes by more than a dynamic threshold amount that depends on the number of demands on the communication network that have been assigned.

10. The method of any one of clauses 1 to 9, wherein: the method further comprises updating scores of edges on the network graph when a communication link on the communication network fails, the edges including the first edge and the scores of the edges including the score of the first edge.

11. A non-transitory computer-readable medium containing instructions that, when executed by at least one processor of a system, cause the system to perform operations for configuring a communication network, comprising: obtaining a network graph representing the communication network, the network graph including: vertices corresponding to nodes in the communication network; and edges corresponding to communication links in the communication network; determining a score for a first edge in the network graph, the score determination comprising: determining a first graph cut on the network graph, the first graph cut having a first graph cut rank and a first graph cut edge set that includes the first edge; and wherein the score depends in part on a first value of a first function for the first graph cut rank, the first function being a decreasing function of the first graph cut rank; determining, using the score for the first edge, a path on the network graph for a demand on the communication network; and configuring the communication network to satisfy the demand using the path.

12. The non-transitory computer-readable medium of clause 11, wherein: the first graph cut divides the network graph into a first subnetwork including first vertices and a second subnetwork including second vertices; and the score determination further comprises: determining a first endpoint pair set corresponding to the first graph cut, the first endpoint pair set including an endpoint pair comprising one of the first vertices and one of the second vertices; and wherein the score further depends on the first endpoint pair set.

13. The non-transitory computer-readable medium of any one of clauses 11 to 12, wherein: the score determination further comprises: determining a first rank endpoint pair set corresponding to the first graph cut rank, the first rank endpoint pair set being a union of endpoint pair sets corresponding to graph cuts on the network graph, the graph cuts having the first graph cut rank and graph cut edge sets that includes the first edge; and wherein the first function is also an increasing function of a size of the first rank endpoint pair set.

14. The non-transitory computer-readable medium of any one of clauses 11 to 13, wherein: the first function is also a decreasing function of the number of vertices in the network graph.

15. The non-transitory computer-readable medium of any one of clauses 11 to 14, wherein: the score determination comprises: determining a second graph cut on the network graph, the second graph cut having a second graph cut rank differing from the first graph cut rank and a second graph cut edge set that includes the first edge; and wherein the score depends in part on a second value of the first function for the second graph cut rank.

16. The non-transitory computer-readable medium of any one of clauses 11 to 15, wherein: the path on the network graph for the demand on the communication network is determined using the score for the first edge and the Dijkstra, Bellman-Ford, or Min-Cost Flow path-finding techniques.

17. The non-transitory computer-readable medium of any one of clauses 11 to 16, wherein: the score depends in part on a second value of a second function, the second function being: a decreasing function of a bandwidth or available bandwidth of a first communication link on the communication network that corresponds to the first edge; or a function of at least one of cost, length, delay, or network segment.

18. The non-transitory computer-readable medium of any one of clauses 11 to 16, wherein: the second function is a decreasing function of the bandwidth or available bandwidth of the first communication link; and the operations further comprise: determining that an update condition of the communication network or a bandwidth condition of the first communication link has been satisfied; and in response to the determination, updating the score of the first edge.

19. The non-transitory computer-readable medium of clause 18, wherein: the update condition is satisfied when: a number of demands on the network have been assigned; and the bandwidth condition is satisfied when: available bandwidth of the first communication link changes; the available bandwidth of the first communication link changes by more than a static threshold amount; or the available bandwidth of the first communication link changes by more than a dynamic threshold amount that depends on the number of demands on the communication network that have been assigned.

20. The non-transitory computer-readable medium of any one of clauses 11 to 19, wherein: the operations further comprise updating scores of edges on the network graph when a communication link on the communication network fails, the edges including the first edge and the scores of the edges including the score of the first edge.

21. A method for configuring a communication network, comprising: obtaining a network graph representing the communication network, the network graph including: vertices corresponding to nodes in the communication network; edges corresponding to communication links in the communication network, the communications links having equal costs, lengths, and delays and belonging to the same network segment; wherein the network graph includes a first subnetwork graph containing more than 10 vertices and a second subnetwork graph containing more than 10 vertices, the first and second subnetwork graphs connected by only two edges, a first edge between a vertex A in the first subnetwork and a vertex X in the second subnetwork and a second edge between the vertex X and a vertex B in the second subnetwork; and wherein a minimum length of a path entirely within the first subnetwork that connects vertex A and vertex B is greater than three; obtaining a demand having vertex A as a source vertex and vertex B as a terminal vertex; determining a path connecting vertex A and vertex B, the path excluding the first edge and the second edge; and configuring the communication network to satisfy the demand using the path.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A method for configuring a communication network, comprising:
    obtaining a network graph representing the communication network, the network graph including:
        vertices corresponding to nodes in the communication network; and
        edges corresponding to communication links in the communication network;
    determining a score for a first edge in the network graph, the score determination comprising:
        determining a first graph cut on the network graph, the first graph cut having a first graph cut rank and a first graph cut edge set that includes the first edge; and
        wherein the score depends in part on a first value of a first function for the first graph cut rank, the first function being a decreasing function of the first graph cut rank;
    determining, using the score for the first edge, a path on the network graph for a demand on the communication network; and
    configuring the communication network to satisfy the demand using the path.

2. The method of claim 1, wherein:
the first graph cut divides the network graph into a first subnetwork including first vertices and a second subnetwork including second vertices; and
the score determination further comprises:
    determining a first endpoint pair set corresponding to the first graph cut, the first endpoint pair set including an endpoint pair comprising one of the first vertices and one of the second vertices; and
    wherein the score further depends on the first endpoint pair set.

3. The method of claim 1, wherein:
the score determination further comprises:
    determining a first rank endpoint pair set corresponding to the first graph cut rank, the first rank endpoint pair set being a union of endpoint pair sets corresponding to graph cuts on the network graph, the graph cuts having the first graph cut rank and graph cut edge sets including the first edge; and
    wherein the first function is also an increasing function of a size of the first rank endpoint pair set.

4. The method of claim 1, wherein:
the first function is also a decreasing function of the number of vertices in the network graph.

5. The method of claim 1, wherein:
the score determination comprises:
    determining a second graph cut on the network graph, the second graph cut having a second graph cut rank differing from the first graph cut rank and a second graph cut edge set that includes the first edge; and
    wherein the score depends in part on a second value of the first function for the second graph cut rank.

6. The method of claim 1, wherein:
the path on the network graph for the demand on the communication network is determined using the score for the first edge and the Dijkstra, Bellman-Ford, or Min-Cost Flow path-finding techniques.

7. The method of claim 1, wherein:
the score depends in part on a second value of a second function, the second function being:
a decreasing function of a bandwidth or available bandwidth of a first communication link on the communication network that corresponds to the first edge; or
a function of at least one of cost, length, delay, or network segment.

8. The method of claim 1, wherein:
the score depends in part on a second value of a second function, the second function being:
a decreasing function of the bandwidth or available bandwidth of the first communication link; and
the method further comprises:
determining that an update condition of the communication network or a bandwidth condition of the first communication link has been satisfied; and
in response to the determination, updating the score of the first edge.

9. The method of claim 8, wherein:
the update condition is satisfied when:
a number of demands on the network have been assigned; and
the bandwidth condition is satisfied when:
available bandwidth of the first communication link changes;
the available bandwidth of the first communication link changes by more than a static threshold amount; or
the available bandwidth of the first communication link changes by more than a dynamic threshold amount that depends on the number of demands on the communication network that have been assigned.

10. The method of claim 1, wherein:
the method further comprises updating scores of edges on the network graph when a communication link on the communication network fails, the edges including the first edge and the scores of the edges including the score of the first edge.

11. A non-transitory computer-readable medium containing instructions that, when executed by at least one processor of a system, cause the system to perform operations for configuring a communication network, comprising:
obtaining a network graph representing the communication network, the network graph including:
vertices corresponding to nodes in the communication network; and
edges corresponding to communication links in the communication network;
determining a score for a first edge in the network graph, the score determination comprising:
determining a first graph cut on the network graph, the first graph cut having a first graph cut rank and a first graph cut edge set that includes the first edge; and
wherein the score depends in part on a first value of a first function for the first graph cut rank, the first function being a decreasing function of the first graph cut rank;
determining, using the score for the first edge, a path on the network graph for a demand on the communication network; and
configuring the communication network to satisfy the demand using the path.

12. The non-transitory computer-readable medium of claim 11, wherein:
the first graph cut divides the network graph into a first subnetwork including first vertices and a second subnetwork including second vertices; and
the score determination further comprises:
determining a first endpoint pair set corresponding to the first graph cut, the first endpoint pair set including an endpoint pair comprising one of the first vertices and one of the second vertices; and
wherein the score further depends on the first endpoint pair set.

13. The non-transitory computer-readable medium of claim 11, wherein:
the score determination further comprises:
determining a first rank endpoint pair set corresponding to the first graph cut rank, the first rank endpoint pair set being a union of endpoint pair sets corresponding to graph cuts on the network graph, the graph cuts having the first graph cut rank and graph cut edge sets that includes the first edge; and
wherein the first function is also an increasing function of a size of the first rank endpoint pair set.

14. The non-transitory computer-readable medium of claim 11, wherein:
the first function is also a decreasing function of the number of vertices in the network graph.

15. The non-transitory computer-readable medium of claim 11, wherein:
the score determination comprises:
determining a second graph cut on the network graph, the second graph cut having a second graph cut rank differing from the first graph cut rank and a second graph cut edge set that includes the first edge; and
wherein the score depends in part on a second value of the first function for the second graph cut rank.

16. The non-transitory computer-readable medium of claim 11, wherein:
the path on the network graph for the demand on the communication network is determined using the score for the first edge and the Dijkstra, Bellman-Ford, or Min-Cost Flow path-finding techniques.

17. The non-transitory computer-readable medium of claim 11, wherein:
the score depends in part on a second value of a second function, the second function being:
a decreasing function of a bandwidth or available bandwidth of a first communication link on the communication network that corresponds to the first edge; or
a function of at least one of cost, length, delay, or network segment.

18. The non-transitory computer-readable medium of claim 17, wherein:
the second function is a decreasing function of the bandwidth or available bandwidth of the first communication link; and
the operations further comprise:
determining that an update condition of the communication network or a bandwidth condition of the first communication link has been satisfied; and
in response to the determination, updating the score of the first edge.

19. The non-transitory computer-readable medium of claim 18, wherein:
the update condition is satisfied when:
a number of demands on the network have been assigned; and
the bandwidth condition is satisfied when:
available bandwidth of the first communication link changes;
the available bandwidth of the first communication link changes by more than a static threshold amount; or
the available bandwidth of the first communication link changes by more than a dynamic threshold amount that depends on the number of demands on the communication network that have been assigned.

20. The non-transitory computer-readable medium of claim 11, wherein:
the operations further comprise updating scores of edges on the network graph when a communication link on the communication network fails, the edges including the first edge and the scores of the edges including the score of the first edge.

21. A method for configuring a communication network, comprising:
obtaining a network graph representing the communication network, the network graph including:
vertices corresponding to nodes in the communication network;
edges corresponding to communication links in the communication network, the communications links having equal costs, lengths, and delays and belonging to the same network segment;
wherein the network graph includes a first subnetwork graph containing more than 10 vertices and a second subnetwork graph containing more than 10 vertices, the first and second subnetwork graphs connected by only two edges, a first edge between a vertex A in the first subnetwork and a vertex X in the second subnetwork and a second edge between the vertex X and a vertex B in the second subnetwork; and
wherein a minimum length of a path entirely within the first subnetwork that connects vertex A and vertex B is greater than three;
obtaining a demand having vertex A as a source vertex and vertex B as a terminal vertex;
determining a path connecting vertex A and vertex B, the path excluding the first edge and the second edge; and
configuring the communication network to satisfy the demand using the path.

* * * * *